(12) United States Patent
Joshi

(10) Patent No.: US 12,104,518 B2
(45) Date of Patent: Oct. 1, 2024

(54) METHOD FOR EMPTYING AN SCR SUPPLY SYSTEM

(71) Applicant: Robert Bosch GmbH, Stuttgart (DE)

(72) Inventor: Rohit Joshi, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/511,700

(22) Filed: Nov. 16, 2023

(65) Prior Publication Data

US 2024/0167409 A1 May 23, 2024

(30) Foreign Application Priority Data

Nov. 17, 2022 (DE) .................... 10 2022 212 244.5

(51) Int. Cl.
*F01N 3/20* (2006.01)
(52) U.S. Cl.
CPC .......... *F01N 3/208* (2013.01); *F01N 3/2066* (2013.01); *F01N 2610/1433* (2013.01); *F01N 2610/146* (2013.01); *F01N 2610/148* (2013.01); *F01N 2610/1493* (2013.01); *F01N 2900/0422* (2013.01); *F01N 2900/1808* (2013.01)

(58) Field of Classification Search
CPC .................. F01N 3/208; F01N 3/2066; F01N 2900/1808; F01N 2900/0422; F01N 2610/1493; F01N 2610/148; F01N 2610/1433; F01N 2610/146
See application file for complete search history.

(56) References Cited

U.S. PATENT DOCUMENTS

| 2012/0020857 A1* | 1/2012 | Isada | F01N 3/208 60/276 |
|---|---|---|---|
| 2012/0067031 A1* | 3/2012 | Wang | F01N 11/00 60/277 |

FOREIGN PATENT DOCUMENTS

DE       102014202038 A1    8/2015

* cited by examiner

*Primary Examiner* — Brandon D Lee
(74) *Attorney, Agent, or Firm* — Michael Best & Friedrich LLP

(57) ABSTRACT

Method for emptying an SCR supply system, wherein the SCR supply system comprises a pump with a pump chamber and an actively controllable inlet valve and an actively controllable outlet valve, wherein an emptying process of the SCR supply system is detected and controlled as a function of the pressure curve in negative pressure phases and/or criteria determined in pressure release phases.

7 Claims, 3 Drawing Sheets

METHOD FOR EMPTYING AN SCR SUPPLY SYSTEM

BACKGROUND

The present invention relates to a method for emptying an SCR supply system, as well as a control unit and a computer program for carrying it out.

In the SCR process (Selective Catalytic Reduction), the reducing agent AdBlue®, which consists of one third urea and two thirds water, is added to the exhaust gas of an internal combustion engine. A nozzle sprays the liquid into the exhaust gas flow directly upstream of the SCR catalytic converter. This is where the ammonia required for the further reaction is produced from the urea. In the second step, the nitrogen oxides from the exhaust gas and the ammonia combine in the SCR catalytic converter to form water and non-toxic nitrogen.

DE 10 2014 202 038 A1 relates to a method for operating a conveyor and dosing system for a liquid medium, in particular for the reacting agent solution of an SCR catalytic converter, in a motor vehicle, partial or complete sucking back of medium from the dosing system after the motor vehicle has been parked is controlled by processing information that allows statements to be made about a risk of freezing of the liquid medium. Partial or complete back suction is controlled depending on the respective probability of freezing.

SUMMARY

The task of the invention is to provide an improved and safe method for emptying an SCR supply system.

In a first aspect, the invention relates to a method for emptying an SCR supply system, wherein the SCR supply system comprises a pump with a pump chamber and an actively controllable inlet valve and an actively controllable outlet valve,
- wherein the SCR supply system is connected to a fluid tank via the inlet valve via a line,
- wherein the SCR supply system is connected to the pressure line and a dosing valve via the outlet valve,
- wherein a pressure in the pressure line is determined by means of a pressure sensor,
- wherein the SCR supply system is in an operating state with a stable minimum pressure, in particular 9 bar,
- wherein the dosing valve is in a closed state,
- wherein when emptying of the SCR supply system is started, at least one negative pressure process is carried out,
- wherein the negative pressure process comprises a negative pressure phase and a pressure release phase,
- wherein in the negative pressure phase, first negative pressure times are determined when the pressure in the pressure line is reached for a specifiable first negative pressure and second negative pressure times are determined when the pressure in the pressure line is reached for a specifiable second negative pressure,
- wherein preferably a specifiable waiting time is waited after the specifiable second negative pressure has been reached,
- wherein a pressure release phase is carried out after the specifiable second negative pressure or the specifiable waiting time has been reached,
- wherein the dosing valve is opened in the pressure release phase until the pressure in the pressure line reaches the specifiable first negative pressure and the dosing valve is closed again,
- wherein negative pressure time differences between the second negative pressure times and the first negative pressure times are determined, characterized in that if one of the negative pressure time differences exceeds a specifiable first reference time difference, the emptying process of the SCR supply system is terminated.

The method has the particular advantage that safe emptying of the dosing module and emptying of the pressure line can be detected from the pressure signal of the negative pressure phase, so that no or only a small amount of liquid remains in the dosing module and in the pressure line.

A urea-water solution known under the trade name AdBlue with a mass concentration of 32.5% urea has a freezing point at −11° C. This is where a eutectic forms, which prevents the solution from freezing. An eutectic forms there, which prevents the solution from separating in the event of freezing.

Even if undesirable segregation does not occur with this composition, freezing of the reducing agent dosing valve and other components of the system, e.g., freezing of pipes, must be prevented as far as possible.

If the system is frozen, the reducing agent could no longer be dosed, which would result in increased nitrogen oxide emissions from the vehicle. If the system should nevertheless freeze under unfavorable environmental conditions, it must be possible to defrost it again while the vehicle is in operation.

Furthermore, crystallization of the urea-water solution in the dosing module can be prevented by the robust emptying of the dosing module.

In a particular embodiment, the specifiable first reference time difference can be determined as a function of the first negative pressure time difference, and in particular correspond to a multiple of the first negative pressure time difference.

The first negative pressure process and thus the first negative pressure time difference is particularly suitable as a reference measurement, as the SCR system was completely filled in this state. The method can therefore be carried out robustly on the basis of this reference time difference.

In a further embodiment, starting with the opening of the dosing valve in the pressure release phase, first pressure release times and second pressure release times are determined when the pressure in the pressure line reaches the specifiable first negative pressure or when the dosing valve closes, wherein pressure release time differences between the second pressure release times and first pressure release times are determined, wherein if one of the pressure release time differences exceeds a specifiable second reference time difference, the emptying process is terminated.

The method can still be carried out robustly on the basis of the pressure release phase.

In a particular embodiment, the specifiable second reference time difference can be determined as a function of the first pressure release time difference, and in particular correspond to a multiple of the first pressure release time difference.

The pressure release time difference determined first also forms a reference time difference for the subsequent pressure release phases.

In an advantageous embodiment, the second pressure release times are determined when the pressure in the pressure line reaches a specifiable factor multiplied by the specifiable first negative pressure.

In the pressure release phase, it is possible that the specifiable first negative pressure $p_{up1}$ cannot be reached. The method can be continued robustly with the specifiable factor, in particular between 0 and 1.

In further aspects, the invention relates to a device, in particular a control device and a computer program configured, in particular programmed, to carry out any one of the methods. In yet another aspect, the invention relates to a machine-readable storage medium on which the computer program is stored.

DETAILED DESCRIPTION

Figure 1:
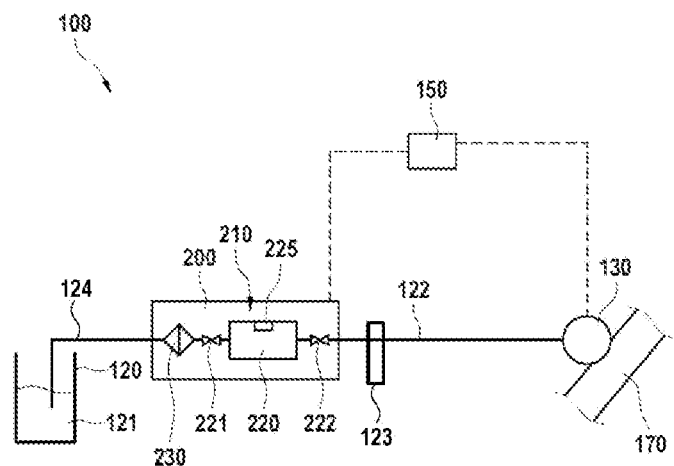
FIG. 1 schematically shows a fluid supply system with a pump in which a method according to the invention can be carried out.
Figure 2:
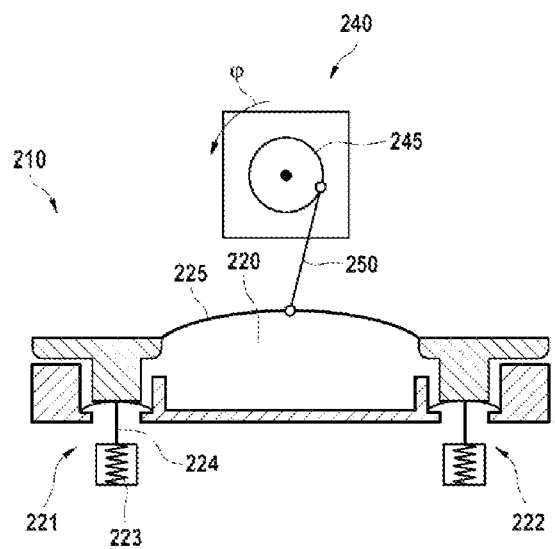
FIG. 2 schematically shows a pump in which a method according to the invention can be carried out.

FIG. 1 shows schematically and by way of example a fluid supply system 100 designed as an SCR supply system, in which a method according to the invention can be carried out with a pump present there. The SCR supply system 100 comprises a pump or conveyor pump 210 with a pump chamber 220, two actively controllable valves 221 and 222 for the pump chamber 220 and a filter 230. These components together form an exemplary conveyor unit 200, which can be provided, for example, as a structural unit.

In the regular flow direction, valve 221 serves as the inlet valve, while valve 222 serves as the outlet valve. In addition, the pump 210 has a conveyor element 225 to increase and decrease the volume of the pump chamber 220. The conveyor element 225 may, for example, be a diaphragm, as will be explained in more detail below.

The pump 210 is now set up to convey reducing agent 121 (or a reducing agent solution) as a fluid to be conveyed from a fluid tank 120 via a pressure line 122 to a dosing module or dosing valve 130. There, the reducing agent 121 is then injected into an exhaust gas line 170 of an internal combustion engine.

Furthermore, the control unit 150 is connected to the conveyor unit 200, in particular to the pump 210, and to the dosing module 130 in order to be able to actuate these. This also comprises actuation of the actively controllable valves 221 and 222.

The first actively controllable valve 221 is designed as an inlet valve 221, which is connected to the fluid tank 120 via a line.

The second actively controllable valve 222 is designed as an outlet valve 222, which is connected to the dosing valve 130 via the pressure line 122.

Furthermore, a pressure sensor 123 is connected to the pressure line 122 such that it can measure a pressure p within the pressure line downstream of the outlet valve 222 and upstream of the dosing valve 130. The pressure sensor 123 is preferably connected by cable to a control unit 150. This receives the signal from pressure sensor 123 and then stores it.

The control unit 150 is set up to coordinate the actuators of the system on the basis of relevant data, such as data received from the engine control unit or from sensors for temperature, pressure and nitrogen oxide content in the exhaust gas, in order to introduce the urea-water solution into the exhaust tract upstream of the SCR catalytic converter in accordance with the operating strategy. Furthermore, on-board diagnostics (OBD), for example, monitors the components and assemblies of the exhaust gas aftertreatment system relevant to compliance with the emission limits.

Figure 3:
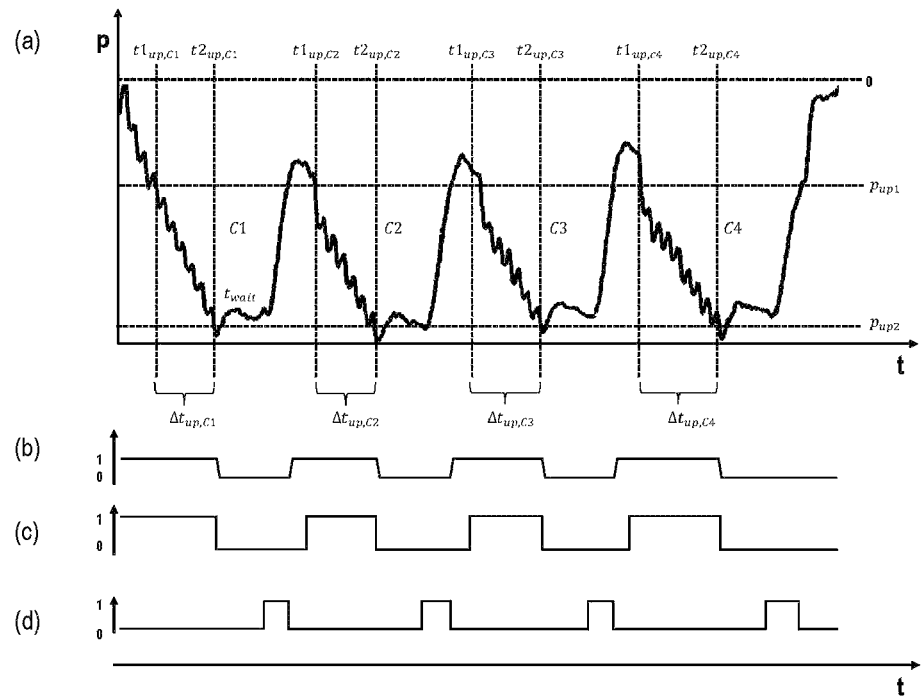
FIG. 3 shows a first example measurement of the pressure curve as well as the control of the pump, the inlet and outlet valves and the dosing valve, especially for the negative pressure phase of several negative pressure processes.

FIG. 3 shows the method using a measurement. The upper diagram (a) shows the curve of the pressure p over time. Furthermore, a specifiable first and second negative pressure $p_{up1}$; $p_{up2}$ are shown in the upper diagram. The specifiable first negative pressure $p_{up1}$ is always selected to be greater than the specifiable second negative pressure $p_{up2}$.

In diagram (b), the speed of pump 210 is plotted against time t. In particular, the pump 210 has 100% speed per minute at a value of one and no speed per minute at a value of zero.

Diagram (c) shows the opening of the valves, in particular the inlet and outlet valves 221;222, over time. With a value of one, the valves are open and with a value of zero, the valves are closed Diagram (d) shows the opening of the dosing valve 130 plotted against time t. In particular, the dosing valve is open at a value of one and closed at a value of zero.

Diagram (a) shows a total of four negative pressure processes $C_i$. A negative pressure process $C_i$ always comprises a negative pressure phase followed by a pressure release phase. Between the negative pressure phase and the pressure release phase, the control unit 150 can wait for an optional waiting time $t_{wait}$ until the pressure release phase is continued.

In the first negative pressure process $C_1$, in the negative pressure phase, a first negative pressure time $t1_{up,C1}$ and a second negative pressure time $t2_{up,C1}$ are determined.

The first negative pressure time $t1_{up,C1}$ corresponds to the time at which the pressure p reaches the specifiable first negative pressure $p_{up1}$.

The second negative pressure time $t2_{up,Ci}$ corresponds to the time at which the pressure p reaches the specifiable second negative pressure $p_{up2}$.

For the first negative pressure process, a first negative pressure time difference $\Delta t_{up,C1}$ is determined as a function of the first and second negative pressure time $t1_{up,C1}$; $t2_{up,C1}$.

It can be clearly seen that the negative pressure time difference $\Delta t_{up,Ci}$ increases with each additional negative pressure process $C_i$.

From diagram (b) and it can be seen that during a return of fluid, the pump 210 is operated at 100% speed per minute and that the inlet and outlet valves 221;222 are also opened. The pressure p decreases steadily and a negative pressure is formed in the system and especially in the pressure line 122. When the second negative pressure time $t2_{up,Ci}$ is determined, the pump 210 continues to operate at 0% speed per minute and the inlet and outlet valves 221;222 are closed.

You can then see how the control unit 150 waits for a waiting time $t_{wait}$ until the point in time at which it can be seen in diagram (d) that the dosing valve 130 is opened.

The dosing valve 130 remains open until the pressure p reaches the specifiable first negative pressure $p_{up1}$ and is closed again.

In an alternative embodiment, the dosing valve 130 remains open until the pressure p reaches a specifiable factor multiplied by the specifiable first negative pressure and is then closed.

The second negative pressure process $C_2$ then begins, followed by the third and fourth negative pressure processes $C_3$; $C_4$. In these negative pressure processes, the negative pressure times $t1_{up,Ci}$, $t2_{up,Ci}$ and the negative pressure time differences $\Delta t_{up,Ci}$ are determined again.

Figure 4:
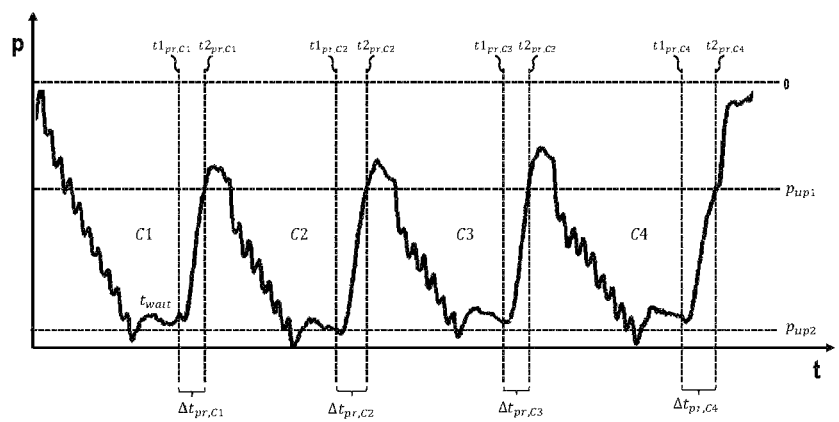
FIG. 4 shows a second example measurement of the pressure curve, especially the pressure release phase of several negative pressure processes.

FIG. 4 shows the same pressure curve as in FIG. 3 (a). Only the first pressure release times $t1_{pr,Ci}$ and second pressure release times $t2_{pr,Ci}$ in the pressure release phases of the negative pressure processes $C_i$ are now shown here.

Starting with the opening of the dosing valve 130 in the first negative pressure process $C_1$, a first pressure release time $t1_{pr,C1}$ is determined and when the pressure p in the pressure line 122 reaches the specifiable first negative pressure $p_{up1}$ or when the dosing valve 130 is closed, a second pressure release time $t2_{pr,C1}$ is determined.

For the first negative pressure process, a first pressure release time difference $\Delta t_{pr,C1}$ is determined as a function of the first and second pressure release times $t1_{pr,C1}$; $t2_{pr,C2}$. This corresponds to a difference between the second pressure release time $t2_{pr,C1}$ and the first pressure release time $t1_{pr,C1}$.

It can be clearly seen that the pressure release time differences $\Delta t_{pr,Ci}$ increase with each additional negative pressure process $C_i$.

Figure 5:
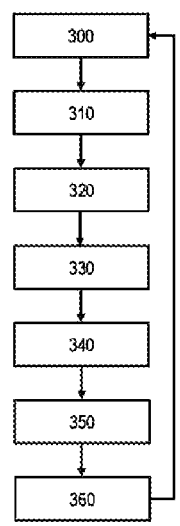
FIG. 5 shows a schematic flow chart of an exemplary embodiment of the method according to the invention.

FIG. 5 shows the exemplary sequence for the method according to the invention for safely emptying an SCR supply system 100.

The method is described below for a first and a second negative pressure process $C_1$; $C_2$. However, the method can be carried out without restriction for $i=1, \ldots, n$, $n \in \mathbb{N}$, negative pressure processes $C_i$.

In a first step 300, an enabling condition for the method is monitored in the control unit 150. The method is enabled when the control unit 150 detects an emptying request for the SCR supply system 100. Advantageously, the SCR supply system 100 has previously been operated in an operating state in which a stable minimum pressure, preferably of 9 bar, was present.

When the emptying request is detected, a first negative pressure process $C_1$ begins and the method is continued in a step 310.

In a step 310, the inlet and outlet valves 221;222 are now opened and, in addition, the pump 210 is operated such that it pumps fluid upstream of the dosing valve 130 back into the fluid tank 120. The pump 210 therefore runs in a return mode. This marks the start of the negative pressure phase of the first negative pressure process $C_1$.

The method is continued in step 320.

In a step 320, the pressure p in the pressure line 122 is continuously received and stored by the control unit 150 by means of the pressure sensor 123.

When the pressure p reaches a specifiable first negative pressure $p_{up1}$, a first negative pressure time $t1_{up,C1}$ is determined and stored by the control unit 150.

The pressure p continues to be read in continuously and when the pressure p reaches a specifiable second negative pressure $p_{up2}$, a second negative pressure time $t2_{up,C1}$ is stored in the control unit 150. A first negative pressure time difference $\Delta t_{up,C1}$ between the second negative pressure time $t2_{up,C1}$ and the first negative pressure time $t1_{up,C1}$ is then determined.

Furthermore, when the specifiable second negative pressure $p_{up2}$ is reached, the pump 210 is deactivated and the inlet and outlet valves 221;222 are closed.

Furthermore, the first negative pressure time difference $\Delta t_{up,C1}$ is compared with a first reference time difference $\Delta t_{up,Ref}$. The first reference time difference $\Delta t_{up,Ref}$ is thereby stored in the control unit 150 in an application phase as a function of the stiffness of the pressure line 122, a pressure line length and a diameter of the pressure line 122 and an ambient pressure.

If the first negative pressure time difference $\Delta t_{up,C1}$ exceeds the first reference time difference $\Delta t_{up,Ref}$, it is assumed that a sufficient amount of fluid has been returned from the dosing line 122 and thus a safe emptying for the SCR supply system 100 or the dosing line 122 and the dosing valve 130 is present.

The method can be terminated in this case. Otherwise, the method is continued in step 330.

In a particular embodiment, a specifiable waiting time $t_{wait}$, which is stored in the control unit 150 in an application phase, can optionally be waited for by the control unit 150 until the method is continued in a step 330.

In a step 330, the dosing valve 130 is now opened and a first pressure release time $t1_{pr,C1}$ is determined and stored by the control unit 150 when the dosing valve 130 is opened. The pressure release phase of the first negative pressure process begins when the dosing valve 130 is opened $C_1$.

In addition, the pressure p is continuously monitored, which now rises again, and when the pressure p exceeds the specifiable first negative pressure $p_{up1}$, the dosing valve 130 is closed and the control unit 150 stores a second pressure release time $t2_{pr,C1}$.

In a special embodiment, a first pressure release time difference $\Delta t_{pr,C1}$ between the second pressure release time ($t2_{pr,C1}$) and the first pressure release time ($t1_{pr,C1}$) can be determined.

Furthermore, the first pressure release time difference $\Delta t_{pr,C1}$ is compared with a second reference time difference $\Delta t_{pr,Ref}$. The second reference time difference $\Delta t_{pr,Ref}$ is thereby stored in the control unit 150 in an application phase as a function of the stiffness of the pressure line 122, a pressure line length and a diameter of the pressure line 122 and an ambient pressure.

If the first pressure release time difference $\Delta t_{pr,C1}$ exceeds the second reference time difference $\Delta t_{pr,Ref}$, it is assumed that a sufficient amount of fluid has been returned from the dosing line 122 and thus a safe emptying for the SCR supply system 100 or the dosing line 122 and the dosing valve 130 is present.

The method can be terminated in this case. Otherwise, the method is continued in step 340.

In a step 340, the second negative pressure process $C_2$ now begins with the negative pressure phase of the second negative pressure process $C_2$.

The inlet and outlet valves 221;222 are now opened again and the pump 210 is activated for return operation.

The method is continued in step 350.

In a step 350, the pressure p in the pressure line 122 is continuously received and stored by the control unit 150 by means of the pressure sensor 123.

When the pressure p reaches a specifiable first negative pressure $p_{up1}$, a third negative pressure time $t1_{up,C2}$ is determined and stored by the control unit 150.

The pressure p is read in continuously and when the pressure p reaches a specifiable second negative pressure $p_{up2}$, a fourth negative pressure time $t2_{up,C2}$ is stored in the control unit 150. A second negative pressure time difference $\Delta t_{up,C2}$ between the third negative pressure time $t2_{up,C2}$ and the fourth negative pressure time $t1_{up,C2}$ is then determined.

Furthermore, when the specifiable second negative pressure $p_{up2}$ is reached, the pump 210 is deactivated and the inlet and outlet valves 221;222 are closed.

Furthermore, the second negative pressure time difference $\Delta t_{up,C2}$ is compared with the first reference time difference $\Delta t_{up,Ref}$.

If the second negative pressure time difference $\Delta t_{up,C2}$ exceeds the first reference time difference $\Delta t_{up,Ref}$, it is assumed that a sufficient amount of fluid has been returned from the dosing line 122 and thus a safe emptying for the SCR supply system 100 or the dosing line 122 and the dosing valve 130 is present.

In a special embodiment, the first reference time difference $\Delta t_{up,Ref}$ can also be determined as a function of the first negative pressure time difference $\Delta t_{up,C1}$. In particular, the first reference time difference $\Delta t_{up,Ref}$ can correspond to a multiple of the first negative pressure time difference $\Delta t_{up,C1}$.

The method can be terminated in this case. Otherwise, the method is continued in step 360.

Optionally, the specifiable waiting time $t_{wait}$, can be waited for again by the control unit 150 until the method is continued in a step 360.

In a step 360, the dosing valve 130 is now opened again and a third pressure release time $t1_{pr,C2}$ is determined and stored by the control unit 150 when the dosing valve 130 is opened. When the dosing valve 130 is opened, the pressure release phase of the second negative pressure process begins $C_2$.

In addition, the pressure p is continuously monitored, which now rises again, and when the pressure p exceeds the specifiable first negative pressure $p_{up1}$, the dosing valve 130 is closed and the control unit 150 stores a fourth pressure release time $t2_{pr,C2}$.

In a special embodiment, a second pressure release time difference $\Delta t_{pr,C2}$ between the third pressure release time $t2_{pr,C2}$ and the fourth pressure release time $t1_{pr,C2}$ can be determined.

Furthermore, the second pressure release time difference $\Delta t_{pr,C2}$ is compared with a second reference time difference $\Delta t_{pr,Ref}$.

If the second pressure release time difference $\Delta t_{pr,C2}$ exceeds the second reference time difference $\Delta t_{pr,Ref}$, it is assumed that a sufficient amount of fluid has been returned from the dosing line 122 and thus a safe emptying for the SCR supply system 100 or the dosing line 122 and the dosing valve 130 is present.

In this case, the method can be terminated and the SCR supply system 100 is safely emptied.

Otherwise, the process is continued with further negative pressure processes $C_i$ until the process detects that the SCR supply system 100 has been safely emptied.

In a particular embodiment, a maximum number of negative pressure processes $C_i$ to be carried out can also be stored in the control unit 150, which can be used as an alternative termination condition for the method.

The invention claimed is:

1. A method for emptying an SCR supply system (100) having a pump (210) with a pump chamber (220), an actively controllable inlet valve (221), and an actively controllable outlet valve (222), wherein the SCR supply system (100) is connected to a fluid tank (120) via the inlet valve (221) and a line (124), and the SCR supply system (100) is connected to the pressure line (122) and a dosing valve (130) via the outlet valve (222), the method comprising:
   determining a pressure (p) in the pressure line (122) using a pressure sensor (123);
   controlling the SCR supply system (100) in an operating state with a stable minimum pressure;
   closing the dosing valve (130);
   emptying the SCR supply system (100) by performing a negative pressure process ($C_i$)
   that includes alternately performing a negative pressure phase and a pressure release phase,
   wherein the negative pressure phase includes
      determining first negative pressure times ($t1_{up,Ci}$) for which the pressure (p) in the pressure line (122) reaches a specifiable first negative pressure ($p_{up1}$) and second negative pressure times ($t2_{up,Ci}$) for which the pressure (p) in the pressure line (122) reaches a specifiable second negative pressure ($p_{up2}$),
      waiting for a specifiable waiting time ($t_{wait}$) after the specifiable second negative pressure ($p_{up2}$) has been reached,
   wherein the pressure release phase is performed after the specifiable second negative pressure ($p_{up2}$) or the specifiable waiting time ($t_{wait}$) has been reached,
   wherein performing the pressure release phase includes
      opening the dosing valve (130), and
      in response to the pressure (p) in the pressure line (122) reaching the specifiable first negative pressure (p), closing the dosing valve (130); and
   the method further includes
      determining negative pressure time differences ($\Delta t_{up,Ci}$) between the second negative pressure times ($t2_{up,Ci}$) and the first negative pressure times ($t2_{up,Ci}$), and
      in response to one of the negative pressure time differences ($\Delta t_{up,Ci}$) exceeding a specifiable first reference time difference ($\Delta t_{up,Ref}$), terminating the emptying process of the SCR supply system (100).

2. The method according to claim 1, wherein the specifiable first reference time difference ($\Delta t_{up,Ref}$) is determined as a function of the first negative pressure time difference ($\Delta t_{up,C1}$), and corresponds to a multiple of the first negative pressure time difference ($\Delta t_{up,C1}$).

3. The method according to claim 1, wherein the method further comprises:
   determining, during the pressure release phase, first pressure release times ($t1_{pr,Ci}$) and second pressure release times ($t2_{pr,Ci}$) according to a time between opening the dosing valve (13) and the pressure (p) in the pressure line (122) reaching the specifiable first negative pressure ($p_{up1}$) or a time of closing the dosing valve (130),
   determining pressure release time differences ($\Delta t_{pr,Ci}$) between the second pressure release times ($t2_{pr,Ci}$) and first pressure release times ($t1_{pr,Ci}$), and
   in response to one of the pressure release time differences ($\Delta t_{pr,Ci}$) exceeding a specifiable second reference time difference ($\Delta t_{pr,Ref}$), terminating the emptying process.

4. The method according to claim 3, wherein the specifiable second reference time difference ($\Delta t_{pr,Ref}$) is determined as a function of the first pressure release time difference ($\Delta t_{pr,C1}$), and corresponds to a multiple of the first pressure release time difference ($\Delta t_{pr,C1}$).

5. The method according to claim 3, wherein the second pressure release time ($t2_{pre,Ci}$) are determined in response to the pressure (p) in the pressure line (122) reaching a specifiable factor multiplied by the specifiable first negative pressure ($p_{up1}$).

6. A non-transitory, computer readable medium storing instructions that when executed by a computer cause the computer to perform a set of operations for controlling an SCR supply system (100) having a pump (210) with a pump chamber (220), an actively controllable inlet valve (221), and an actively controllable outlet valve (222), wherein the SCR supply system (100) is connected to a fluid tank (120) via the inlet valve (221) and a line (124), and wherein the SCR supply system (100) is connected to the pressure line (122) and a dosing valve (130) via the outlet valve (222), the set of operations comprising:
  determining a pressure (p) in the pressure line (122) using a pressure sensor (123);
  controlling the SCR supply system (100) in an operating state with a stable minimum pressure;
  closing the dosing valve (130);
  emptying of the SCR supply system (100) by performing a negative pressure process ($C_i$)
  that includes alternately performing a negative pressure phase and a pressure release phase,
  wherein the negative pressure phase includes
    determining first negative pressure times ($t1_{up,Ci}$) for which the pressure (p) in the pressure line (122) reaches a specifiable first negative pressure ($p_{up1}$) and second negative pressure times ($t2_{up,Ci}$) for which the pressure (p) in the pressure line (122) reaches a specifiable second negative pressure ($p_{up2}$),
    waiting for a specifiable waiting time ($t_{wait}$) after the specifiable second negative pressure ($p_{up2}$) has been reached,
  wherein the pressure release phase is performed after the specifiable second negative pressure ($p_{up2}$) or the specifiable waiting time ($t_{wait}$) has been reached,
  wherein performing the pressure release phase includes
    opening the dosing valve (130), and
    in response to the pressure (p) in the pressure line (122) reaching the specifiable first negative pressure (p), closing the dosing valve (130); and
  the method further includes
    determining negative pressure time differences ($\Delta t_{up,Ci}$) between the second negative pressure times ($t2_{up,Ci}$) and the first negative pressure times ($t2_{up,Ci}$), and
    in response to one of the negative pressure time differences ($\Delta t_{up,Ci}$) exceeding a specifiable first reference time difference ($\Delta t_{up,Ref}$), terminating the emptying process of the SCR supply system (100).

7. A device for emptying an SCR supply system (100) having a pump (210) with a pump chamber (220), an actively controllable inlet valve (221), and an actively controllable outlet valve (222), wherein the SCR supply system (100) is connected to a fluid tank (120) via the inlet valve (221) and a line (124), and the SCR supply system (100) is connected to the pressure line (122) and a dosing valve (130) via the outlet valve (222), the device comprising an electronic processor configured to perform a set of operations comprising:
  determining a pressure (p) in the pressure line (122) using a pressure sensor (123);
  controlling the SCR supply system (100) in an operating state with a stable minimum pressure;
  closing the dosing valve (130);
  emptying the SCR supply system (100) by performing a negative pressure process ($C_i$) that includes alternately performing a negative pressure phase and a pressure release phase,
  wherein the negative pressure phase includes
    determining first negative pressure times ($t1_{up,Ci}$) for which the pressure (p) in the pressure line (122) reaches a specifiable first negative pressure ($p_{up1}$) and second negative pressure times ($t2_{up,Ci}$) for which the pressure (p) in the pressure line (122) reaches a specifiable second negative pressure ($p_{up2}$),
    waiting for a specifiable waiting time ($t_{wait}$) after the specifiable second negative pressure ($p_{up2}$) has been reached,
  wherein the pressure release phase is performed after the specifiable second negative pressure ($p_{up2}$) or the specifiable waiting time ($t_{wait}$) has been reached,
  wherein performing the pressure release phase includes
    opening the dosing valve (130), and
    in response to the pressure (p) in the pressure line (122) reaching the specifiable first negative pressure (p), closing the dosing valve (130); and
  the method further includes
    determining negative pressure time differences ($\Delta t_{up,Ci}$) between the second negative pressure times ($t2_{up,Ci}$) and the first negative pressure times ($t2_{up,Ci}$), and
    in response to one of the negative pressure time differences ($\Delta t_{up,Ci}$) exceeding a specifiable first reference time difference ($\Delta t_{up,Ref}$), terminating the emptying process of the SCR supply system (100).

* * * * *